W. S. WALLACE.
FLYTRAP.
APPLICATION FILED APR. 27, 1920.
1,379,948.
Patented May 31, 1921.
2 SHEETS—SHEET 1.
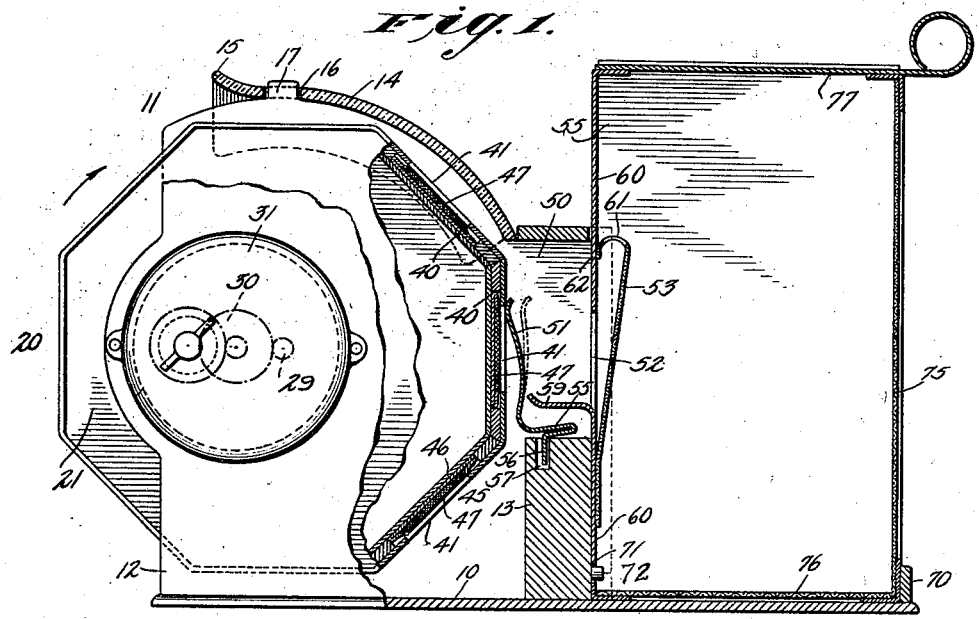
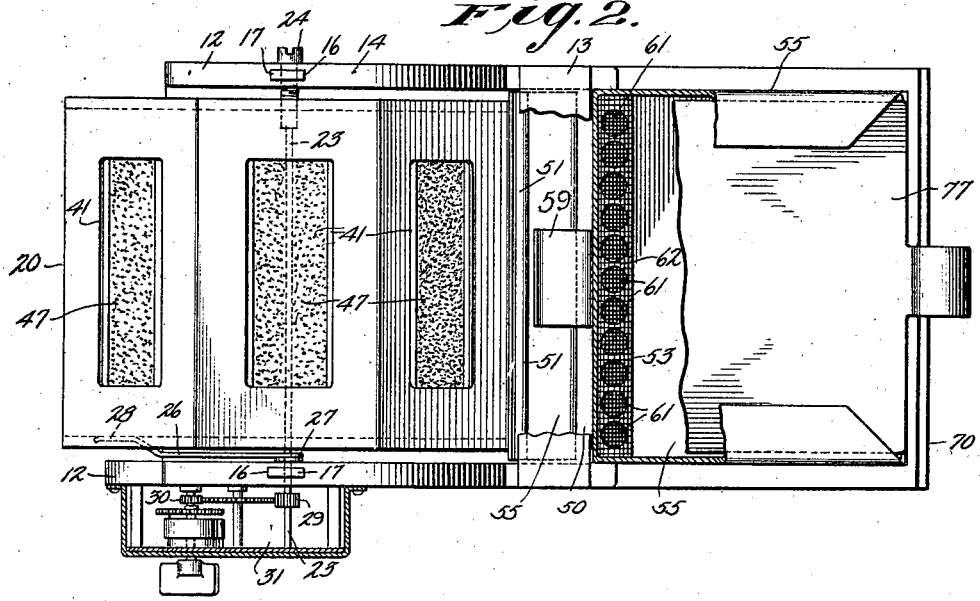
WITNESSES
INVENTOR
WILLIAM SIMPSON WALLACE,
BY
ATTORNEYS W. S. WALLACE.
FLYTRAP.
APPLICATION FILED APR. 27, 1920.
1,379,948.
Patented May 31, 1921.
2 SHEETS—SHEET 2.
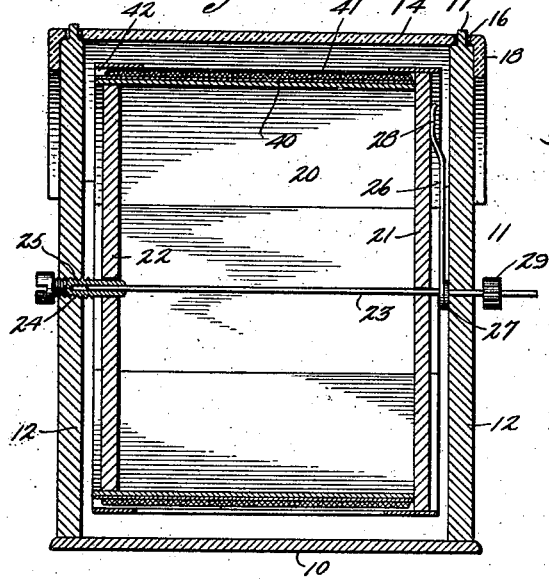
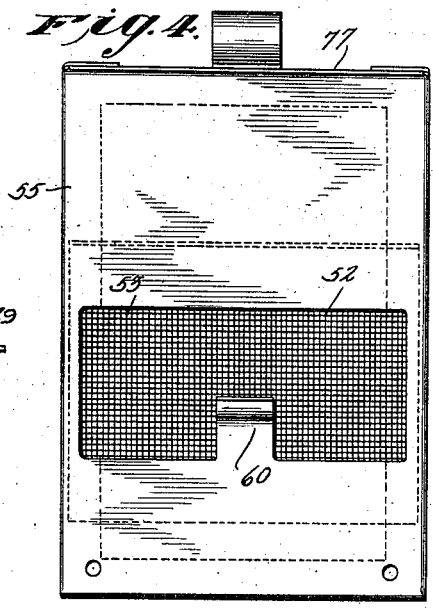
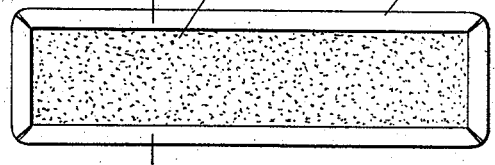
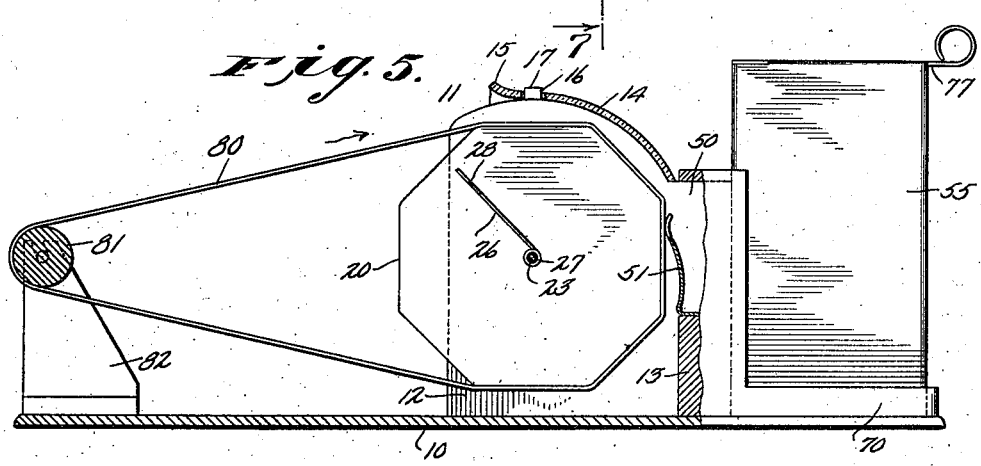
WITNESSES
INVENTOR
WILLIAM SIMPSON WALLACE,
BY
ATTORNEYS

UNITED STATES PATENT OFFICE.

WILLIAM SIMPSON WALLACE, OF FORT WORTH, TEXAS, ASSIGNOR OF ONE-HALF TO CASPER O. DALIET, OF TAYLOR, TEXAS.

FLYTRAP.

1,379,948. Specification of Letters Patent. Patented May 31, 1921.

Application filed April 27, 1920. Serial No. 377,021.

*To all whom it may concern:*

Be it known that I, WILLIAM SIMPSON WALLACE, a citizen of the United States, and a resident of Fort Worth, in the county of Tarrant and State of Texas, have invented a new and Improved Flytrap, of which the following is a full, clear, and exact description.

The invention relates to fly traps such as shown and described in the Letters Patent of the United States, No. 1,017,027, granted to me on February 13, 1912.

The object of the present invention is to provide a new and improved fly trap arranged to insure a proper transfer of the flies or other insects from the bait to the revolving cage without crushing the insects on the bait and thus spoiling the latter.

Another object is to permit of convenient removal of the cage from the trap without danger of the captured flies escaping from the cage.

Another object is to permit of conveniently renewing the bait whenever it is necessary.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the improved fly trap with parts shown in elevation;

Fig. 2 is a plan view of the same with parts shown in section;

Fig. 3 is a transverse section of the same;

Fig. 4 is an elevation of the front or entrance end of the cage;

Fig. 5 is a side elevation partly in section of a modified form of the improved fly trap;

Fig. 6 is a face view of one of the bait holders; and

Fig. 7 is a cross section of the same on the line 7—7 of Fig. 6.

The improved fly trap is mounted on a suitably constructed base 10, on which is erected a casing 11 having sides 12, a back 13 and a segmental top 14, preferably of glass or other similar diaphanous material. The top 14 has its forward end 15 flaring upwardly and adjacent this end are formed openings 16 engaged by lugs 17 forming part of the sides 12 to hold the top 14 in position, the rear end of which rests on the back 13. The top 14 is provided with side flanges 18 fitting against the outer faces of the sides 12 of the casing 11 to hold the top securely in position on the sides 12.

In the casing 11 is mounted to turn a bait carrier which, as shown in Figs. 1, 2 and 3, is in the form of a drum 20 made polygonal and having heads 21 and 22, of which the head 21 is mounted to rotate loosely on a driven shaft 23 while the head 22 is mounted to turn loosely on a screw 24 screwed in one of the sides 12 (see Fig. 3) and having a central recess or bore 25 in which extends the corresponding end of the shaft 23 to form a bearing for the same, it being understood that the shaft 23 also has a bearing in the other side 12 of the casing 11. It will be noticed that by the arrangement described the shaft 23 can turn independently of the drum 20, and in order to drive the latter from the shaft 23 use is made of a spring clutch or a coupling 26, preferably in the form of a piece of spring wire, secured at one end 27 on the shaft 23 and bearing with its other end 28 against the outer face of the drum head 21, the pressure exerted by said spring, however, not being enough to force the edge 42 against the wall 12 of the casing because the wall 12 is on, that is, has a bearing on the smooth cored-out portion of the screw and thus cannot be forced thereon past the annular shoulder. On the shaft 23 is secured a pinion 29 in mesh with a train of gear wheels 30 of a spring motor 31 of any approved construction and attached to one of the sides 12 of the casing 11.

Each of the sides of the drum 20 is in the form of a pocket 40 having an opening 41 on the peripheral face of the drum and having an opening 42 at the head 22 of the drum, as plainly shown in Fig. 3. In each of the pockets 40 is removably held a bait carrier 45 having a holding member 46, of sheet metal or other material, supporting a strip 47 of soft material which is roughened to provide an adhering surface for honey or other bait used to attract flies or other insects. The baited surface appears through the opening 41 of the pocket 40 so that flies can readily alight on this baited surface and are carried by the slowly rotating drum 20 under the top 14 of the casing 11, it being understood that the drum 20 rotates in the direction of the arrow shown in Fig. 1. It will further be noticed that ample space is provided for the insects to be carried under the top 14 by way of the upwardly flaring mouth 15, and when a side of the drum with the holder 45 reaches the rear half of the top 14 then the flies are trapped owing to the corners of the corresponding side of the drum 20 being in close proximity to the under side of the top 14. Thus the flies are trapped and prior to being trapped are not liable to fly off as the transparency of the top 14 tends to deceive them as to the unobstructed space.

The back 13 of the casing 11 is provided with an opening 50 in which is arranged a scraper 51 for scraping off the flies or other insects on the bait carrier 45. The scraped off flies pass into the opening 50 and from the latter pass by way of an entrance opening 52 and a guard 53 into a cage 55 removably supported on the base 10 adjacent the outer face of the back 13. The scraper 51 is preferably in the form of a sheet metal plate having a base portion 55 from which depends a pivot member 56 extending into a slot 57 formed in the bottom wall of the opening 50 thus providing a gravity scraper 51 which rests with its free end on the peripheral face of the drum 20. It will be noticed that by the arrangement described the scraper 51 is free to swing owing to the polygonal shape of the drum, but as the scraper has but a light contact with the peripheral face of the drum it is evident that the caught flies are readily scraped off the bait carrier 45 without danger of crushing the same and thus spoiling the bait on the carrier. In order to prevent the scraper 51 from swinging too far rearward, use is made of flange 59 attached to or forming part of the entrance wall 60 of the cage 55 and projecting into the opening 50, as plainly indicated in Figs. 1 and 2. The guard 53 previously mentioned is preferably in the form of a piece of wire gauze attached at its lower end to the entrance wall 60 of the cage 55 and extends upwardly and rearwardly in the rear of the entrance opening 52 to allow the caught flies to readily pass through the opening 52 onto the guard 53 and up the same and through openings 61 formed in a return bend 62 forming part of the upper end of the guard 53. The return bend 62 abuts against the inner face of the entrance wall 60 of the cage 55 and by the arrangement described the openings 61 into the cage 55 allow the flies to pass into the cage but prevent them from returning or passing out of the cage by way of the openings 61 owing to the arch-shape given to the return bend 62.

The base 10 is preferably provided at its rear portion with a flange 70 for engaging the lower portion of the cage 55 exteriorly to hold the cage securely in position on the base. The entrance wall 60 of the cage 55 is preferably provided near its lower end with openings 71 engaging pins 72 on the back 13 to hold the cage against accidental displacement on the base 10. The rear wall 75 and the bottom 76 of the cage are preferably made of wire netting to admit air and light, and the top of the cage is preferably provided with a sliding cover 77 for removing the flies from the cage after the same have been killed by drowning or by heat or otherwise.

In the modified form shown in Fig. 5, the drum pockets 40 and removable bait carriers 45 are omitted, and use is made of a bait carrier 80 in the form of an endless band passing around the drum 20 and around a collar 81 located a distance from the drum 20 and removably journaled in standards 82 erected on the base 10. The outer surface of the endless band is coated with a suitable bait and when the drum 20 is revolved by the clockwork or other motor 31 as above described then a traveling motion is given to the bait carrying band 80 in the direction indicated by the arrow whereby the flies feeding on the bait are carried along and under the top 14 to be finally scraped off when reaching the opening 50 in the back 13 of the casing 11. It will be noticed that by the use of the endless bait carrying band a large baiting surface is provided. The band can be readily removed for recoating with bait whenever it is deemed necessary to do so. It is understood that the drum 20 can be removed from the casing 11 on withdrawing the shaft 23 and unscrewing the bearing screw 24, and the collar 81 can be readily lifted off the standards 82 to permit of disengaging the endless bait carrying band from the drum 20 and the collar 81 and to allow of replacing the freshly coated band on the drum.

Having thus described my invention, I claim as new and desire to secure by Letters Patent:—

1. In a trap of the class described, a casing having an opening provided in its bottom with a groove, a polygonal drum having bait-carrying means removable on each face thereof adapted to convey insects to the said opening, an upstanding gravity scraper in the form of a plate held in the said opening and having a base provided with a depending member loosely engaging the said bottom groove to allow the scraper to rock, the upper free end of the scraper engaging the said bait-carrying means to remove the insects therefrom, and a cage removably associated with the said casing and having an entrance at the said opening to allow the insects to pass from the opening into the cage.

2. In a trap of the class described, a casing having an opening provided in its bottom with a groove, a rotatable drum having a series of removable bait carrying means upon its periphery adapted to convey insects to the said opening, an upstanding gravity scraper in the form of a plate held in the said opening and having a base provided with a depending member loosely engaging the said bottom groove to allow the scraper to rock, the upper free end of the upstanding scraper lying against the said bait-carrying means to remove the insects therefrom, a cage removably associated with the said casing and having an entrance at the said opening to allow the insects to pass from the opening into the cage, and a stop on the said cage and projecting into the said opening to limit the movement of the said scraper.

3. In a trap of the class described, a casing having an opening, bait carrying means arranged to convey insects to the said opening, removing means held in the said opening and arranged to remove the insects from the said bait carrier, and a cage removably associated with the said casing and having in its front an entrance opening in register with the said casing opening and a screen attached to the said front and extending upwardly and rearwardly in the rear of the said entrance opening, the top of the screen having a return bent flange abutting against the cage front, the said return bent flange having an opening through the bend for the passage of the insects upwardly into the cage.

4. In a trap of the class described, a drum provided with bait-carrying means, a scraper coacting with the drum to scrape off the insects, a shaft on which the drum is mounted to rotate loosely, a motor driving the said drum shaft, and a friction clutch connecting the said drum shaft with the said drum.

5. In a trap of the class described, a drum provided with bait-carrying means, a scraper coacting with the drum to scrape off the insects, a shaft on which the drum is mounted to rotate loosely, a motor driving the said drum shaft, and a spring attached at one end to the said shaft and having its free end bearing laterally against one of the heads of the drum.

6. In a trap of the class described, a drum of polygonal shape and having each of its sides provided with a removable bait-carrying panel.

7. In a trap of the class described, a drum of polygonal shape and having each of its sides provided with a pocket open at the face of the drum and at one of the heads, and a bait-carrying panel adapted to be inserted into the said pocket or removed therefrom through the open head end.

8. In a trap of the class described, a drum of polygonal shape and having each of its sides provided with a pocket open at the face of the drum and at one of the heads, and a bait-carrying panel adapted to be inserted into the said pocket or removed therefrom through the open head end, the panel having a holder and a piece of rough material removably held in the said holder for supporting the bait.

9. In a trap of the class described, a casing provided with sides and with a segmental top of diaphanous material, the said top having side flanges fitting exteriorly onto the said sides, the latter having lugs and the top having openings through which extend the said lugs to hold the glass top in place.

WILLIAM SIMPSON WALLACE.